Ｕnited States Patent Office 2,965,618
Patented Dec. 20, 1960

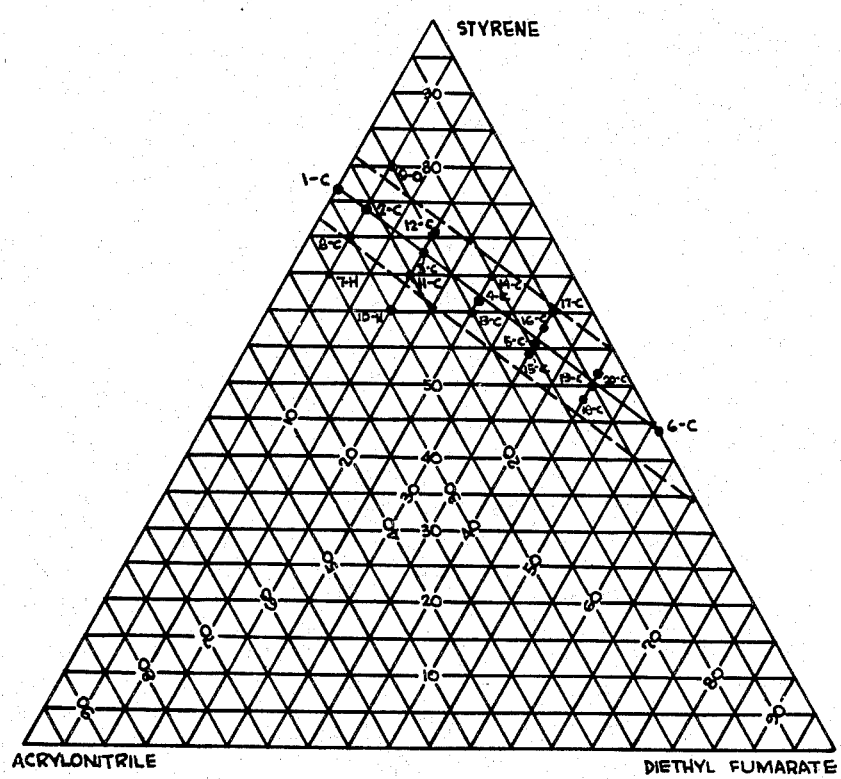
STYRENE/ACRYLONITRILE/DIETHYL FUMARATE TERPOLYMERS
WT. %
FIG I

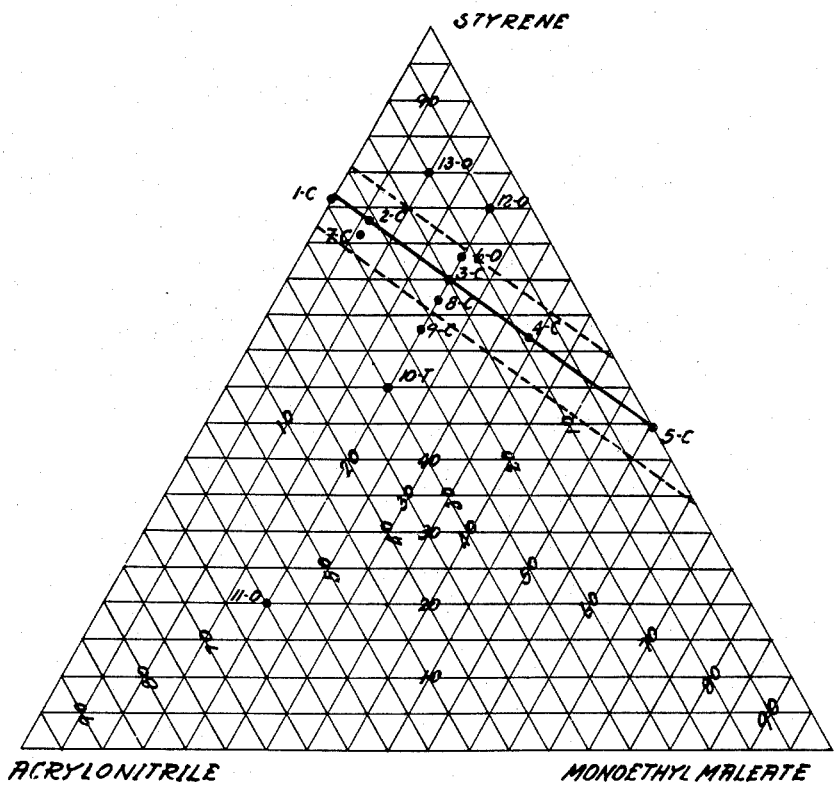
STYRENE/ACRYLONITRILE/MONOETHYL MALEATE TERPOLYMERS
WT. %
FIG II

2,965,618

INTERPOLYMERS

Robert J. Slocombe, Dayton, and George L. Wesp, Englewood, Ohio, assignors to Monsanto Chemical Company, St. Louis, Mo., a corporation of Delaware Original application Dec. 7, 1953, Ser. No. 396,506, now Patent No. 2,829,128, dated Apr. 1, 1958. Divided and this application Mar. 31, 1958, Ser. No. 725,172

11 Claims. (Cl. 260—78.5)

This invention relates to three-component interpolymers, commonly called terpolymers, i.e., interpolymers prepared by polymerizing a monomeric mixture consisting of three different monomers. In specific aspects the invention pertains to terpolymers of (a) a monomer selected from the group consisting of styrene, vinyltoluene, and vinylxylene, (b) acrylonitrile, and (c) a monomer selected from the group consisting of dialkyl fumarate, methacrylic acid, methacrylonitrile, alkyl methacrylate, methyl vinyl ketone, monoalkyl fumarate, and monoalkyl maleate. Other aspects of the invention relate to improved methods of preparing clear terpolymers.

This application is a division of our copending application Serial No. 396,506, filed December 7, 1953, issued as U.S. Patent 2,829,128 on April 1, 1958. Said U.S. 2,829,128 claims certain terpolymers of (a) a monomer selected from the group consisting of styrene, vinyltoluene and vinylxylene, (b) acrylonitrile, and (c) a dialkyl fumarate, and processes for making same, whereas the present application claims certain terpolymers of (a) a monomer selected from the group consisting of styrene, vinyltoluene and vinylxylene, (b) acrylonitrile, and (c) a monomer selected from the group consisting of monoalkyl fumarate and monoalkyl maleate, and processes for making same.

It is by now well known that ethylenically unsaturated monomers differ greatly in their polymerization reactivity toward each other. There are in fact some monomers that will not undergo homopolymerization at all, i.e., polymerization of two or more molecules of the same monomer to form a polymer of that monomer, yet will readily undergo interpolymerization with certain other monomers. Interpolymerization affords a method of imparting varying characteristics to a polymer, and in many instances such characteristics cannot be obtained by mere physical admixture of two or more homopolymers. However, because of the above-mentioned differences in reactivity among monomers toward each other, marked heterogeneity is the rule in interpolymers and only under special circumstances can an interpolymer be obtained that is of sufficient homogeneity to give a transparent or clear interpolymer. While some objectionable properties such as color, encountered in interpolymers, can often be avoided by means such as the use of stabilizers or lower polymerization temperatures, incompatibility manifested by haze, turbidity, or opacity in plastics is not overcome by such treatment.

If a monomeric mixture is subjected to polymerization and the initial increment of polymer is segregated before the polymerization is allowed to go forward to an appreciable extent, it is frequently possible to obtain a clear interpolymer, but the commercial impracticability of such a procedure is apparent. On the other hand, if polymerization is permitted to proceed to a considerable and especially to a high degree of conversion, the more reactive monomer enters into the polymer to a greater extent than a less reactive monomer or monomers with the consequence that residual unreated monomer becomes more and more depleted in the more reactive monomer, while the polymer being formed in the latter stages of polymerization is deficient in the more reactive monomer. There results a polymeric material which is made up of a variety of polymer molecules running a gamut of compositions such that the total polymer is heterogeneous with resultant opacity and often greatly impaired physical properties. This phenomenon, resulting in an undesirable product, can be overcome to an appreciable but limited extent by gradually adding during the course of the polymerization the more reactive monomer at a rate aimed at keeping the composition of unreacted monomeric mixture essentially constant. As a practical matter it is extremely difficult to approach uniformity in such an operation, and it is impossible to use this technique at all in the case of mass (bulk) polymerization in which the polymerization reaction mixture sets up into semi-solid or solid polymer after the reaction is only partly completed so that further access of added monomer to the total mixture cannot be obtained.

It is only in recent years that systematic laboratory and theoretical studies of interpolymerization have gone forward sufficiently to permit a certain amount of predictability in this field. It has been theorized that in a simple binary system involving the free-radical-initiated polymerization of only two monomers, the composition of polymer will be dependent only upon the rate of four propagation steps, i.e., steps in the propagation of polymer molecules. Thus, taking a system involving two monomers, $M_1$ and $M_2$, a growing polymer chain can have only two kinds of active terminal groups, i.e., a group derived from $M_1$ or a group derived from $M_2$. Either of these groups has the possibility of reacting with either $M_1$ or with $M_2$. Using $m_1 \cdot$ and $m_2 \cdot$ to indicate these active terminal groups, the four possible reactions are as follows:

| Growing Chain | Adding Monomer | Rate of Progress | Reaction Product |
|---|---|---|---|
| $\sim\sim m_1 \cdot$ | $M_1$ | $k_{11}[m_1 \cdot][M_1]$ | $\sim\sim m_1 m_1 \cdot$ |
| $\sim\sim m_1 \cdot$ | $M_2$ | $k_{12}[m_1 \cdot][M_2]$ | $\sim\sim m_1 m_2 \cdot$ |
| $\sim\sim m_2 \cdot$ | $M_2$ | $k_{22}[m_2 \cdot][M_2]$ | $\sim\sim m_2 m_2 \cdot$ |
| $\sim\sim m_2 \cdot$ | $M_1$ | $k_{21}[m_2 \cdot][M_1]$ | $\sim\sim m_2 m_1 \cdot$ |

Theoretical considerations lead to the now generally accepted copolymer composition equation which describes the ratio $$\frac{[M_1]}{[M_2]}$$

of the molar concentrations of two monomers in the initial copolymer formed from a given mixture of the monomers as follows:

$$\frac{d[M_1]}{d[M_2]} = \frac{[M_1]}{[M_2]} \cdot \frac{r_1[M_1]+[M_2]}{r_2[M_2]+[M_1]}$$

In this equation $r_1$ equals $k_{11}/k_{12}$ and $r_2$ equals $k_{22}/k_{21}$. The terms $r_1$ and $r_2$ are called "reactivity ratios." A very considerable body of experimental work has in general confirmed the copolymer composition equation.

A large proportion of possible pairs of monomers are incapable, because of their respective reactivity ratios, of forming under any conditions an instantaneous polymer having the same composition as the monomeric mixture from which it is formed. However there are certain monomer pairs which, in a proportion characteristic of that pair, give a copolymer having the same composition as the particular monomeric mixture. In such instances, a batch polymerization can be carried out with a monomeric mixture of the particular composition with a resultant homogeneous copolymer containing the same relative proportions of the monomers as in the initial monomeric reaction mixture. This composition is known as the polymerization azeotrope composition, and is represented by the equation:

$$\frac{[M_2]}{[M_1]} = \frac{r_1 - 1}{r_2 - 1}$$

Such an azeotrope composition can exist only for those monomer pairs wherein both $r_1$ and $r_2$ are less than one, or theoretically wherein both $r_1$ and $r_2$ are greater than one although no examples of the latter combination are known.

While an understanding of interpolymerization involving only two monomers is now possible to a considerable extent, because of the development of the above-discussed theories, an increase in the number of monomers to three or more obviously tremendously increases the possibilities and complications. Thus, for example if interpolymers of 100 monomers are to be considered, there are about 5000 possible monomer pairs, but about 160,000 different combinations of three monomers are possible, and for each of these 160,000 combinations the variations in relative proportions of the three monomers are infinite. If the assumptions made in the development of the copolymer composition equation still hold true where three monomers are to be interpolymerized, it is apparent that the composition of the terpolymers formed at any given instance will now be dependent upon the rate of nine propagation steps which are dependent upon the relative concentrations of the monomers in the monomeric mixture and the reactivity ratio between each of the pairs of the monomers in the mixture. It has been pointed out that the study of terpolymers can be simplified somewhat by application of the copolymer composition equation, suitably modified for three-component systems, so as to eliminate from consideration monomers whose ability to interpolymerize is so slight that further investigation of such combinations is obviously not warranted. However, the discovery of terpolymers having particularly desired physical properties has to the present time been limited to the "needle in the haystack" type of investigation. There is an obvious need for some procedure in the terpolymer field whereby terpolymers of particular properties can be made with a reasonable degree of predictability.

In accordance with the present invention, we have found a group of terpolymers that can be made by free-radical-initiated batch polymerization and that have the very desirable property of clarity. These terpolymers are made by polymerizing a monomeric mixture of certain proportions of three monomers. The proportions giving clear terpolymers will vary from one monomeric mixture to another depending upon the particular monomers present in that mixture. The invention is particularly applied to monomeric mixtures consisting essentially of (a) a monomer selected from the group consisting of styrene, vinyltoluene, and vinylxylene, (b) acrylonitrile, and (c) a monomer selected from the group consisting of dialkyl fumarate, methacrylic acid, methacrylonitrile, alkyl methacrylate, methyl vinyl ketone, monoalkyl fumarate, and monoalkyl maleate. For example, a monomeric mixture consisting of styrene, acrylonitrile and methyl methacrylate will, when subjected to free-radical-initiated batch polymerization, give a clear terpolymer only if the relative proportions of styrene, acrylonitrile and methyl methacrylate are properly chosen in a manner to be hereinafter described. In contrast, a monomeric mixture consisting of styrene, acrylonitrile and methacrylonitrile will give a clear terpolymer on being subjected to free-radical-initiated batch polymerization only if the relative proportions of the three mentioned monomers in the monomeric mixture are within certain limits which in general are different from those of the aforementioned mixtures of styrene, acrylonitrile and methyl methacrylate, and yet which are chosen in accordance with the same principle now to be discussed.

We have found that clear terpolymers of the nature described are made provided the proportions of three monomers in the monomeric mixture are chosen from the area lying along the line joining the binary polymerization azeotrope composition of the particular (a) and acrylonitrile on the one hand, and the binary polymerization azeotrope composition of the particular (a) and the particular (c) on the other hand, as plotted on a triangular coordinate graph. By way of example, taking the case where (a) is styrene and (c) is methyl methacrylate, the point of the binary azeotrope composition of styrene and acrylonitrile is placed along one side of a triangular coordinate graph at the proper location between the apex designating 100 percent styrene and the apex designating 100 percent acrylonitrile. This point is 76 to 77 weight percent styrene and 24 to 23 weight percent acrylonitrile. On the opposite side of the equilateral triangle, constituting the triangular coordinate graph, is placed the point representing the binary azeotrope composition of styrene and methyl methacrylate; this of course being located at the proper position on the side of the triangle between the apex representing 100 percent styrene and the apex representing 100 percent methyl methacrylate. This point is 54 weight percent styrene and 46 weight percent methyl methacrylate. Now a straight line is drawn between these two points. This line cuts across the triangular coordinate graph, without touching the side of the triangle opposite the styrene apex which side represents varying proportions of acrylonitrile and methyl methacrylate in binary mixtures of same. Acrylonitrile and methyl methacrylate do not form a binary azeotrope. The said straight line joining the two points of binary azeotrope compositions describes three-component monomeric mixtures which, when subjected to free-radical-initiated batch polymerization, give clear terpolymers. Further, there is an appreciable area lying on each side of said line in which the terpolymers are essentially clear. However, one cannot go too far from this line without producing terpolymers which are not clear but range from hazy to opaque materials. The invention particularly applies to the area lying within 5 percent on each side of said line; said 5 percent is measured on the graph in a direction normal to the line, and is equal to five one-hundredths of the shortest distance between an apex and the side of the triangle opposite that apex. Terpolymers made by polymerizing a monomeric mixture having a composition lying in the area within 5 percent on each side of the line joining the two binary polymerization azeotrope compositions, are generally clearer than polymers made from similar monomeric mixtures lying farther away from and on the same side of the line. In most systems all terpolymers made from monomeric mixtures having compositions in the area lying within 5 percent on each side of the line are clear. In some systems the area of clarity may not extend as far as 5 percent from the line. Those skilled in the art, having had the benefit of the present disclosure, can easily determine by simple tests of the nature described herein which monomeric mixtures give clear terpolymers in a given polymerization system. In all events, the compositions of monomeric mixtures giving clear terpolymers will be found to constitute an area lying along the line joining the two binary polymerization azeotrope compositions.

The reasons for the clarity of terpolymers made as described are not known. The line joining the two binary azeotrope compositions does not represent what might be called a series of three-component azeotropes. From much detailed data which we have obtained, the relative proportions of the three monomers in terpolymers made from monomeric mixtures lying along said line are not identical to the monomeric mixture from which the terpolymer is being prepared. In other words, during the course of a batch polymerization of a monomeric mixture whose composition is taken from the line, the composition of residual monomeric material drifts and the terpolymers so formed are not homogeneous mixtures of polymer molecules all of which contain monomer units in the same ratio, but rather are mixtures of polymer molecules having varying proportions of the three monomer units therein. No heretofore known scientific facts or theories of interpolymerization explain our discovery. However, regardless of the various reasons for believing that terpolymers made from compositions lying along the line as aforesaid would be heterogeneous, and regardless of the actual reasons for the clarity of such terpolymers, it is apparent that the present invention makes possible the production of clear terpolymers with obvious attendant advantages, especially in films and molded articles made from the terpolymers.

The accompanying drawings are triangular coordinate graphs showing compositions of some three-component monomeric mixtures that give clear terpolymers on being subjected to free-radical-initiated batch polymerization.

Figure I represents the system styrene/acrylonitrile/diethyl fumarate.

Figure II represents the system styrene/acrylonitrile/monoethyl maleate.

By the present invention we can subject a given monomeric mixture consisting of three monomers, selected as described herein, to a batch polymerization and carry the polymerization reaction to complete or essentially complete, say 90 to 100 percent, conversion of all of the monomers and yet obtain a clear solid resinous terpolymer. If desired, the polymerization can be stopped at any point short of completion so long as polymerization conditions are such as to produce solid terpolymer, but this is not necessary in order to obtain a clear terpolymer and would seldom be advantageous. The higher the degree of conversion of monomeric mixtures, the greater the advantages of our invention. This is because the greatest extent of heterogeneity is found with complete conversion to polymers. A high conversion, i.e., at least 50 weight percent conversion and preferably at least 80 weight percent conversion, is preferred in practicing the invention. However, some of the benefits of the invention may be realized even where the percentage conversion is as low as 20 percent. With very low conversions, the polymer formed tends to approach the perfect homogeneity existing in the first infinitely small increment of polymer formed. As pointed out above, commercial practicality requires that conversion be carried to a value more than a few percent, hence introducing the lack of homogeneity which up to now, the art has not known how to avoid other than by techniques such as gradual monomer addition. It is to be recognized that the extent of the area of clear terpolymers, lying along the line joining the two binary polymerization azeotrope compositions, is dependent not only on the particular polymerization system but also on the percentage conversion, said area being the greater the lower the percentage conversion, and the smaller the higher the percentage conversion. It is observed that the terpolymers become clearer as the composition of the monomeric mixture approaches the line joining the two binary azeotrope compositions, the general rule being that the clearest terpolymers are those derived from monomeric compositions lying on the line.

It is usually desirable that the three-component monomeric mixture contain at least 2 weight percent, and preferably at least 5 weight percent, of the monomer present in the smallest amount.

The invention is broadly applicable to any free-radical-initiated interpolymerization of three-component monomeric mixtures containing the monomer combinations and in the proportions set forth herein, provided the polymerization is carried out by a batch procedure. By this it is meant that all of the monomeric materials to be employed are introduced simultaneously in the desired proportions into the polymerization reaction system. Ordinarily a single charge of monomeric materials will be placed in a reaction vessel and the single charge subjected to polymerization conditions until the polymerization is substantially complete. However, it is not outside the scope of our invention to introduce continuously a monomeric mixture containing the three monomers in fixed proportions into a flow-type polymerization system, whereby the initial polymerizable mixture passes away from its point of introduction and ultimately is recovered as polymer. This can be accomplished by continuous flowing of the monomeric mixture into the first of a series of polymerization reaction vessels with continuous flow of reaction mixture from one vessel to another along a series of two or more such vessels with ultimate recovery of polymer from the last in the series. Those skilled in the art will understand that this operation is essentially a batch operation in the sense that additional monomeric material of composition different from the original mixture is not introduced into a partially polymerized material. Thus, the term "batch polymerization," as used herein, means a polymerization which does not involve the gradual or incremental or subsequent addition of a monomer or monomers having a composition different from the initial monomeric mixture.

The invention is perhaps most advantageously effected by the mass or bulk polymerization procedure. In such procedure the reaction mixture is free from added solvent or other reaction medium and consists solely of monomers, resultant polymers, and catalyst and regulator, if any. An important advantage of the invention is that such a mass polymerization can be effected to produce a clear terpolymer in a situation in which it is impossible to use the gradual monomer addition technique discussed above.

If desired, the interpolymers of the present invention can be made by the suspension or the emulsion polymerization techniques. For suspension polymerization a reaction medium such as water is used together with a small amount of suspending agent, for example tricalcium phosphate, carboxymethylcellulose, etc., to give a suspension of particles of initial monomeric mixture, which particles are not of such small size as to result in a permanently stable latex. Where the particles are of quite large size, this type of polymerization is often called "pearl" polymerization. To effect emulsion polymerization, sufficient amount of emulsifying agent, for example a water-soluble salt of a sulfonated long chain alkyl aromatic compound, a surface active condensation product of ethylene oxide with long chain aliphatic alcohols or mercaptans, etc., is employed along with vigorous agitation whereby an emulsion of the reactants in water is formed and the product is obtained in the form of a latex. The latex can then be coagulated if desired by known methods and the polymer separated from the water. For some applications the latex can be employed directly as for example for forming a film, and the resulting film after evaporation of the water will be clear when the polymers are made in accordance with the present invention. The emulsion technique has certain advantages particularly in that a very high degree conversion of the monomers is obtained with considerable rapidity, since the heat of reaction is easily carried off by indirect heat exchange with the reaction mixture which contains a considerable proportion of water. Such polymerizations are often effected with redox-type catalyst systems at moderate temperatures of say 60° C. on down to 0° C. and below.

The polymers of the present invention can also be made in the presence of an added organic solvent. It should be recognized however that the presence of such a solvent ordinarily results in a polymer of lower molecular weight than that obtained in the absence of the solvent.

Conventional recipes and procedures for effecting mass, solvent, suspension and emulsion polymerizations are so well-known to those skilled in the art, that they need not be further detailed here.

From the foregoing, it will be apparent that the term, "monomeric mixture," as used in the claims refers only to the polymerizable monomeric materials used in the process, and that additionally solvents, aqueous reaction media, catalysts, etc., can be present or not in the reaction mixture as may be desired in any particular case. In other words, in the claims "monomeric mixture" is not necessarily synonymous with "reaction mixture."

Polymerization can be effected by any of the well-known free radical mechanisms. The polymerization is initiated and carried on by virtue of free radicals, which can be derived from the monomers themselves on simple heating of the monomeric mixture to a suitable temperature, or can be derived from added free-radical-supplying catalysts, especially the "per" compounds and the "azo" compounds, or can be derived by ultraviolet or other irradiation of the reaction mixture with or without the presence of photosensitizers, e.g., organic disulfides. The examples set forth hereinafter describe "thermal" polymerizations in which the polymerization reaction was initiated and maintained merely by heating the monomeric mixture in the absence of any added catalyst. In many instances it will be desired to add a suitable polymerization catalyst, in which case sufficient catalyst is employed to give a desired reaction rate. Suitable catalysts are of the free-radical-promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include benzoyl peroxide, ditertiary butyl peroxide, tertiary butyl hydroperoxide, diacetyl peroxide, diethyl peroxycarbonate, 2-phenyl propane-2-hydroperoxide (known also as cumeen hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N— bonded to one or two organic radicals, preferably at least one of the bonds being to a tertiary carbon atom. By way of example of suitable azo-type catalysts can be mentioned α,α'-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy-type or azo-type polymerization catalyst is used in small but catalytic amounts, which are generally not in excess of one percent by weight based upon the monomeric material. A suitable quantity is often in the range of 0.05 to 0.5 percent by weight.

Photopolymerization is another suitable procedure for carrying out the present invention. This is ordinarily accomplished by irradiating the reaction mixture with ultraviolet light. Any suitable source of light is employed having effective amounts of light with wave lengths of 2,000 to 4,000 Angstrom units. The vessel in which the polymerization is conducted should be transparent to light of the desired wave length so that the light can pass through the sides of the container. Suitable glasses are available commercially and include borosilicate ("Pyrex"), "Vycor," and soft glass. Alternatively, the source of light can be placed directly over the surface of the monomer in a container or can be placed within the reaction mixture itself. In some instances it is helpful to add a material that can be termed a photosensitizer, i.e., a material which increases the rate of photopolymerization, for example organic disulfides as described in U.S. Patent No. 2,460,105.

Choice of a suitable temperature for a given polymerization will readily be made by those skilled in the art having been given the benefit of the present disclosure. In general, suitable temperatures will be found within the range of 0° C. to 200° C., although temperatures outside this range are not beyond the scope of the invention in its broadest aspects. The time required for complete polymerization will depend not only upon the temperature but also upon the catalyst if any is employed, the ability of the system to remove heat of polymerization, and the particular monomers employed. The examples set forth hereinafter give some illustrative information as to reaction times for particular polymerizations.

The term "triangular coordinate graph" as used herein is well understood. The accompanying figures are examples of such graphs and the use of same. However, for the sake of completeness the following statement can be made concerning the character of such triangular graphs. The graph is an equilateral triangle, divided off by three series of parallel lines each series being parallel to one side of the triangle. The distance between an apex of the triangle and the side opposite that apex represents variations in percentages of the component designated by that apex varying from 100 percent to 0 percent in equal increments running from the apex to the opposite side of the triangle. For example, if the distance between the apex and the side of the triangle opposite the apex is divided into 100 equal parts by lines passing across the triangle and parallel to said side, each line represents 1 percent of the component for which that apex is designated. Thus, any point within the triangle represents a single three-component composition, the indicated percentages of the three components totaling 100 percent.

As an aid in the choice of suitable proportions of monomers for polymerization in accordance with the invention the following data on reactivity ratios of certain monomer pairs are presented by way of example. The values given are considered the best ones represented in the literature or otherwise known (see "Copolymers" by Alfrey, Bohrer and Mark, Interscience Publishers, Inc., 1952, pp. 32-43). In many instances an attempt is made to set forth an approximate order of accuracy. These latter figures, expressed as plus or minus certain values, should not however be given too much credence since such attempts to evaluate possible errors are dependent to a considerable extent on subjective evaluation of the data. Most of the values for reactivity ratios given are for moderate temperatures, say between about room temperature (20° C.) and 100° C. Of course, the value of the reactivity ratios for a monomer pair is a function of temperature but the variation in reactivity ratios with temperature is quite small and is of little importance unless the polymerization is to be carried out at temperatures considerably removed from those mentioned. Likewise, the reactivity ratios given are for atmospheric or autogenous pressure. Only if the polymerization pressure is to be quite considerably increased will there be an important change in the value of the reactivity ratios. It may also be pointed out that in the case of highly water-soluble monomers the reactivity ratio values may be shifted somewhat from those given, when polymerization is effected in an aqueous system. Those skilled in the art, having been given the benefit of the present disclosure, will be able to evaluate the effect, if any, of reaction conditions on the values given herein and determine the extent of such effect. Similarly, those skilled in the art can determine by well-known procedures the correct reactivity ratios for monomer pairs not specifically set forth in the following tabulation, which tabulation is given by way of example of some but not all of the monomers that are the subject matter of the present invention.

In the following tabulation styrene is considered as $M_1$ and the other monomers in each instance are considered as $M_2$. Substitution of the values for $r_1$ and $r_2$ in the equation given above for the binary polymerization azeotrope composition permits an immediate determination of the proper location for the two points to be placed on the triangular coordinate graph, between which points is drawn the line of clear terpolymers.

TABLE

| $M_1$ | $M_2$ | $r_1$ | $r_2$ |
|---|---|---|---|
| Styrene | Acrylonitrile | 0.41 ±0.08 | 0.03 ±0.03 |
| Do | Diethyl fumarate | 0.30 ±0.02 | 0.07 ±0.007 |
| Do | Dimethyl fumarate | 0.21 ±0.02 | 0.025±0.015 |
| Do | Methacrylic acid | 0.15 ±0.01 | 0.7 ±0.05 |
| Do | Methacrylonitrile | 0.30 ±0.10 | 0.16 ±0.06 |
| Do | Methyl methacrylate | 0.520±0.026 | 0.460±0.026 |
| Do | Methyl vinyl ketone | 0.29 ±0.04 | 0.35 ±0.02 |
| Do | Monoethyl fumarate | 0.18 ±0.10 | 0.25 ±0.10 |
| Do | Monoethyl maleate | 0.13 ±0.01 | 0.035±0.01 |

Where $M_1$ is to be vinyltoluene or vinylxylene, the same reactivity ratios are used, on the assumption that the reactivity ratios for such systems do not differ essentially for the purposes of this invention from the reactivity ratios of the corresponding systems wherein styrene is $M_1$. This assumes that the introduction of one or two methyl groups into the aromatic nucleus of styrene does not greatly alter the polarity and steric properties of the vinyl double bond. Likewise, when an alkyl methacrylate other than methyl methacrylate is to be used, the reactivity ratios are assumed not to differ essentially for the purposes of this invention from the above reactivity ratios involving methyl methacrylate. This assumes that a moderate increase in the chain length of the alkyl group in the alkyl methacrylates over the single carbon atom in the methyl group of methyl methacrylate, or a branching of the chain if such is present, does not greatly alter the polarity and steric properties of the vinyl double bond. Similar assumptions are made with respect to the various dialkyl fumarates as a group, with respect to the various monoalkyl fumarates as a group, and with respect to the various monoalkyl maleates as a group. Thus, although the reactivity ratios for styrene/dimethyl fumarate and for styrene/diethyl fumarate appear to differ considerably from each other, the values of the binary azeotrope compositions for these two systems calculated from said different reactivity ratios, given in the table above, differ from each other by only two percentage points. Anyone skilled in the art, desiring greater precision, can use well-known standard procedures to determine the reactivity ratios for a given binary system not previously reported in the art. With monomers having a fairly long chain alkyl groups, the reactivity ratios tend to differ considerably from those for the corresponding methyl monomer and hence should be individually determined. Whenever weight percent rather than mole percent is desired as a matter of convenience, mole percentages of the binary azeotrope compositions are easily converted to weight percent by use of the molecular weights of the particular $M_1$ and $M_2$. In the case of dialkyl fumarates, alkyl methacrylates, monoalkyl fumarates, and monoalkyl maleates, any of which can be copolymerized with acrylonitrile and any one of the monomers styrene, vinyltoluene, and vinylxylene in the practice of this invention, special preference is given to the lower alkyl groups. Alkyl groups containing from 1 to 4 carbon atoms are particularly valuable, viz., methyl, ethyl, n-propyl, isopropyl, n-butyl, iso-butyl, sec.-butyl, tert.-butyl. However, the invention is also applicable to the alkyl compounds mentioned, that contain alkyl groups of up to 8 carbon atoms per alkyl group and even higher. In the case of dialkyl fumarates, there are included those dialkyl fumarates wherein both alkyl groups are the same and those dialkyl fumarates wherein two different alkyl groups are present in the molecule.

The following examples illustrate some methods for practicing the present invention with respect to certain ternary mixtures of monomers. The general applicability of the invention, and advantages thereof, are shown in these examples. It will be appreciated that variations can be made in the particular choice of monomers, proportions, and methods of polymerization in accordance with the general teachings of the present specification, and the examples are not to be taken as co-extensive with the invention in its broadest aspects.

*Example 1*

This example concerns the ternary system styrene/acrylonitrile/diethyl fumarate. The data obtained in this example are set forth graphically in Figure I of the drawings.

The composition of the styrene/diethyl fumarate binary azeotrope was calculated in the following manner according to the article by Mayo and Walling, Chemical Reviews, 46, 199 (1950). The value of 0.08 used for $r_2$ is the average of two values given in that article.

Styrene ($M_1$)
Diethyl fumarate ($M_2$)
$r_1=0.30$
$r_2=0.08$ $$\frac{[M_1]}{[M_2]} = \frac{0.08-1}{0.30-1} = \frac{-0.92}{-0.70} = 1.3$$

$[M_1]+[M_2]=100$
$1.3[M_2]+[M_2]=100=2.3[M_2]$
$[M_2]=43.4$ mole percent diethyl fumarate
$[M_1]=56.6$ mole percent styrene
Molecular weight of diethyl fumarate=172.2
Molecular weight of styrene=104.1
$0.434 \times 172.2 = 74.8$ grams diethyl fumarate
$0.566 \times 104.1 = 58.8$ grams styrene 133.6 grams mixture $(74.8 \times 100)/133.6 = 56$ weight percent diethyl fumarate
$(58.8 \times 100)/133.6 = 44$ weight percent styrene The foregoing calculations give the compositions of the styrene/diethyl fumarate binary polymerization azeotrope as 44 weight percent styrene, 56 weight percent diethyl fumarate.

By the same procedure, the binary polymerization azeotrope for styrene/acrylonitrile was calculated to be 77 weight percent styrene, 23 weight percent acrylonitrile, using slightly different reactivity ratio values than in the examples following.

A series of monomeric mixtures was made up, each mixture being prepared by admixture of the individual pure monomers in a "Pyrex" test tube 150 mm. long and having an internal diameter within the approximate range of 14 to 18 mm., usually about 16 mm. Each test tube containing the particular monomeric mixture was flushed with nitrogen in order to remove any air present in the gas space above the liquid, and the test tube was then sealed off at the top by heating the tube under nitrogen and pulling it out in the flame to seal the tube completely. Each particular monomer mixture was prepared and polymerized in duplicate.

After the various tubes containing the monomeric mixtures had been prepared, they were placed in a 90° C. constant temperature bath, and held there for 24 hours. At the end of that period they were moved to a 120° C. constant temperature bath and held there for 24 hours. At the end of this second 24-hour period the tubes were removed and placed in an oven maintained at 180° C., and held therein for 8 hours.

The various monomeric compositions are set forth in detail in Table I. Table I designates each different mixture by sample number. Sample No. 1 is the binary styrene/acrylonitrile azeotrope composition. Sample No. 6 is the binary styrene/diethyl fumarate azeotrope composition. Samples 2, 3, 4, and 5 have compositions which fall on a straight line connecting the two binary azeotrope compositions, designated samples Nos. 1 and 6, when plotted on triangular coordinates. See Figure I.

Samples 7 to 20, inclusive, were prepared with compositions which varied so that several series of two or three different compositions running along constant diethyl fumarate composition lines and cutting across the line joining the two binary azeotropes could be examined.

At the end of the polymerization cycle described above, all the polymers formed in the sealed tubes were carefully examined visually by the same observer, looking through the diameter of the cylindrical body of polymer obtained by breaking and removing the glass tube; this cylinder of polymer conformed to the internal shape and size of the glass tube. These visual observations were checked by other observers. It was determined that the clarity noted for polymer samples is not significantly affected by variation in polymer cylinder diameter within the range of about 14 to 18 millimeters. It is to be understood that where clarity of polymers is discussed herein, reference is made to the appearance on looking through a cylindrical body of the polymer having a diameter within the approximate range of 14 to 18 millimeters. The following words were adopted for describing the clarity of polymers.

C—Clear—essentially crystal clear
H—Hazy—some cloudiness but slight
T—Turbid—moderately cloudy
O—Opaque—dense cloudiness—similar to milk glass in appearance "Clear" means relatively free from gross amounts of haze but allows the presence of slight haze to be detected with close examination in strong light. Specific notation that a sample was "crystal" clear means not only that no haze was apparent to the observer, but also that the sample showed a sparkling appearance as found in high quality crystal glassware.

Several of the polymer products were analyzed for nitrogen and the acrylonitrile content of the polymer calculated. In each instance it was close to the acrylonitrile content of the monomeric mixture, but consistently ran slightly low, which the literature states is the uniform experience in nitrogen determinations on polymers.

The alcohol solubles content of many of the polymers was determined, using the following standard procedure:

A 0.3 gram-sample of polymer is dissolved in 20 ml. acetone (or other suitable solvent), then the polymer is precipitated by adding 250 ml. absolute ethanol to the solution; the precipitate is coagulated, filtered off, dried and weighed. The average of two determinations is given. The alcohol solubles content (ASC) gives an approximate measure of the extent of conversion. The material soluble in alcohol is principally monomer; only very low molecular weight polymers, e.g., dimers and trimers, are soluble in alcohol. Thus, 100—ASC approximates the percentage conversion.

The specific viscosity was determined on the total polymer, and on the undissolved residue from the alcohol solubles test. The specific viscosity determinations were made on a 0.1 weight percent solution of polymer in dimethylformamide.

TABLE I

STYRENE/ACRYLONITRILE/DIETHYL FUMARATE TERPOLYMERS

| Sample No. | Composition, Weight Percent DEF/AN/S | Appearance | | Percent AN* in Polymer | Alcohol Solubles Content, Weight Percent | Specific Viscosity | |
|---|---|---|---|---|---|---|---|
| | | Clarity | Color | | | Total Polym. | Alcohol Insoluble Residue |
| 1 | 0/23/77 | C—Clear | Colorless | 22.3 | 3.61 | 0.191 | 0.188 |
| 2 | 5/21/74 | ----do---- | ----do---- | 20.1 | 4.88 | 0.177 | 0.182 |
| 3 | 15/17/68 | ----do---- | ----do---- | 15.9 | 7.21 | 0.158 | 0.178 |
| 4 | 25/13/62 | ----do---- | ----do---- | 12.3 | 10.61 | 0.128 | 0.145 |
| 5 | 35/9/56 | ----do---- | V. sl. yellow | 9.17 | 17.9 | 0.107 | 0.124 |
| 6 | 56/0/44 | ----do---- | Colorless | 0.0 | 40.3 | 0.039 | 0.066 |
| 7 | 5/30/65 | H—Hazy | Yellow | | | | |
| 8 | 5/25/70 | C—Clear | V. sl. yellow | 23.4 | 4.7 | 0.199 | 0.210 |
| 9 | 5/17/78 | O—Opaque | White | | | | |
| 10 | 15/25/60 | H—Hazy | Yellow | | | | |
| 11 | 15/20/65 | C—Clear (sl. hazy) | Sl. Yellow | 18.9 | 7.9 | 0.167 | 0.174 |
| 12 | 15/14/71 | ----do---- | Colorless | | | | |
| 13 | 25/15/60 | C—Clear | V. sl. yellow | 11.7 | 14.1 | 0.138 | 0.158 |
| 14 | 25/10/65 | ----do---- | Colorless | 9.2 | 8.9 | 0.116 | 0.128 |
| 15 | 35/11/54 | ----do---- | Light yellow | | | | |
| 16 | 35/7/58 | ----do---- | Colorless | | | | |
| 17 | 35/5/60 | ----do---- | ----do---- | | | | |
| 18 | 45/7/48 | ----do---- | Light yellow | | | | |
| 19 | 45/5/50 | ----do---- | V. sl. yellow | | | | |
| 20 | 45/3/52 | ----do---- | Colorless | | | | |

DEF = Diethyl fumarate.
AN = Acrylonitrile.
S = Styrene.
Sl. = Slightly.
V. Sl. = Very slightly.
* = Calculated from nitrogen analysis.

Referring now to Fig. I of the drawings, the clarity data given in Table I have been designated alongside each of the corresponding ternary monomeric mixtures composition indicated by a point on a triangular coordinate plot. The various numerals on Fig. I located adjacent the respective points refer to the sample number in Table I. All of the points marked "C" were rated as clear, and of these all were crystal clear with the exception of points 11 and 12, each of which had a slight haze but not sufficient to consider them other than essentially clear or to bring them from the clear rating into the hazy rating.

Examination of Fig. I immediately shows that terpolymers prepared from monomeric mixtures having compositions lying on the line joining the two binary azeotrope compositions were clear, as were terpolymers within the area lying along said line. However, going appreciably beyond 5 percent on each side of the line the terpolymers become non-clear. Thus, points 7 and 10 were hazy and point 9 was opaque. It is interesting to note that points 7 and 10 below the line are about 10 percent away from the line and yet only hazy, whereas point 9 above the line is about 7 percent away from the line and yet is opaque. Such behavior is consistent with most physical phenomena which seldom exhibit perfect regularity. The data in the present example demonstrate that terpolymers made from ternary monomeric mixtures whose composition is taken from along the line and from a significant area lying on each side of the line are clear, and also that polymers falling within the area within 5 percent of each side of the line constitute a new group of terpolymers having the extremely important property of clarity.

Another interesting thing to note is that by the practice of the present invention terpolymers of minimum color ordinarily result. Thus, polymers 7 and 10 of those tested, farthest away from the line were yellow, while the color decreased as the line was approached. All those polymers lying below the line had at least a trace of yellow color but the color intensity decreased as the line was approached. Those above the line had no color, other than point 9 which was white and opaque.

In Fig. I the dashed lines drawn parallel to the line joining the two binary azeotrope compositions are 5 percent on each side of the line, i.e., each is a distance from the line equal to 5 percentage points of composition as determined by dividing the distance between an apex and the center of the opposite side of the triangle into 100 equal equidistant parts.

Example 2

This example presents data on the ternary system styrene/acrylonitrile/monoethyl maleate.

Considering styrene as $M_1$ and monoethyl maleate as $M_2$, the reactivity ratios are $r_1=0.13$ and $r_2=0.035$. From these data, in the manner set forth in Example 1, the binary polymerization azeotrope composition of styrene/monoethyl maleate was calculated to be 44.7 weight percent styrene, 55.3 weight percent monoethyl maleate. The composition for the styrene/acrylonitrile binary polymerization azeotrope composition was similarly calculated as 76.3 weight percent styrene, 23.7 weight percent acrylonitrile.

Samples were prepared and tested in the manner set forth in Example 1. For most of the samples the polymerization cycle was 24 hours at 90° C., 25 hours at 120° C., and 7½ hours at 180° C. For samples 5 and 9 the cycle was 24 hours at 90° C., 46½ hours at 120° C. For sample 11, the cycle was 24 hours at 90° C., 25 hours at 120° C.

The first five compositions selected for test fall on the line joining the two binary polymerization azeotrope compositions. Samples 6, 8, 9, 10, 11 and 12, as well as sample 3, cut across that line on a line of constant 20 weight percent monoethyl maleate, thus covering a wide variety of compositions. Samples 7 and 13 are on opposite sides of the line from each other, are disposed at a considerable distance from the other points, and contain 10 percent and less monoethyl maleate.

The data on compositions and polymer properties are set forth in Table II, and are given graphically in Fig. II of the drawings.

TABLE II
STYRENE/ACRYLONITRILE/MONOETHYL MALEATE TERPOLYMERS

| Sample No. | Composition. Wt. Percent S/AN/MEM | Appearance | |
|---|---|---|---|
| | | Clarity | Color |
| 1 | 76/24/0 | C—Clear | Colorless. |
| 2 | 73/21/6 | ---do | Lt. yellow. |
| 3 | 67/15/20 | ---do | Do. |
| 4 | 57/9/34 | C—Clear (V. sl. haze) | Do. |
| 5 | 45/0/55 | C—Clear | Colorless. |
| 6 | 68/12/20 | O—Opaque | White. |
| 7 | 71/23/6 | C—Clear | Lt. yellow. |
| 8 | 62/18/20 | ---do | Do. |
| 9 | 58/22/20 | ---do | Do. |
| 10 | 50/30/20 | T—Turbid | Yellow. |
| 11 | 20/60/20 | O—Opaque | Lt. yellow (soft and sticky). |
| 12 | 75/5/20 | ---do | White. |
| 13 | 80/10/10 | ---do | Do. |

S=Styrene.
AN=Acrylonitrile.
MEM=Monoethyl maleate.

As in the other examples, it will be observed that the polymers made from monomeric mixtures whose compositions fall on the line joining the two binary polymerization azeotropes are clear. Further, the area of clarity lying along the line is appreciable, and is greater below the line, i.e., in the direction of decreasing styrene content, than above the line in the direction of increasing styrene content. Thus, point 6 lying between 3 and 4 percent away from the line in the direction of increasing styrene content, was opaque, so that the area of clear terpolymers does not extend this far in this part of the graph. In comparison point 8, directly opposite point 6 on the other side of the line, is clear; see also point 7. Continuing along the 20 percent monoethyl maleate line, point 9, which is about 8 percent away from the line, is still clear. However, by the time point 10 is reached, the polymer made from the monomeric mixture having that composition is turbid, and still further away from the line lies point 11 whose polymer was opaque. On the opposite side of the line, points 12 and 13 are opaque.

These data show that, as in other examples, opacity appears more quickly as one moves away from the line in the direction of increasing styrene concentration than it appears in moving away from the line in the opposite direction.

The dashed lines drawn on each side of the principal line and 5 percent away from that line includes compositions which are preferred. Even in those regions of the composition diagram in which non-clear polymers are formed, e.g. point 6, such polymers are more transparent, i.e. less opaque, than those drawn from compositions in the same region but lying outside the 5 percent line, e.g. point 12.

While the invention has been described herein with particular reference to various preferred embodiments thereof, and examples have been given of suitable proportions and conditions, it will be appreciated that variations from the details given herein can be effected without departing from the invention. When desired, the terpolymers of the present invention can be blended with other polymers, plasticizers, solvents, fillers, pigments, dyes, stabilizers, and the like, in accordance with the particular use intended.

We claim:
1. A clear terpolymer prepared by free-radical initiated batch polymerization to a conversion of at least 20 weight percent of a monomeric mixture consisting of (a) a monomer selected from the group consisting of styrene, vinyltoluene and vinylxylene, (b) acrylonitrile, and (c) a monomer selected from the group consisting of monoalkyl fumarate and monoalkyl maleate, the proportions of the three monomers in said monomeric mixture being limited to those in the area of mixtures that produce clear terpolymers, said area encompassing the line joining the polymerization azeotrope composition of the particular (a) and acrylonitrile on the one hand and the particular (a) and the particular (c) on the other hand as plotted on an equilateral triangular coordinate graph.

2. A clear terpolymer prepared by free-radical initiated batch mass polymerization to a conversion of at least 20 weight percent of a monomeric mixture consisting of (a) a monomer selected from the group consisting of styrene, vinyltoluene and vinylxylene, (b) acrylonitrile, and (c) a monomer selected from the group consisting of monoalkyl fumarate and monoalkyl maleate, the proportions of the three monomers in said monomeric mixture being limited to those in the area of mixtures that produce clear terpolymers, said area encompassing the line joining the polymerization azeotrope composition of the particular (a) and acrylonitrile on the one hand the particular (a) and the particular (c) on the other hand as plotted on an equilateral triangular coordinate graph.

3. A clear terpolymer prepared by free-radical initiated batch polymerization to a conversion of at least 20 weight percent of a monomeric mixture consisting of (a) styrene, (b) acrylonitrile, and (c) a monomer selected from the group consisting of monoalkyl fumarate and monoalkyl maleate, the proportions of the three monomers in said monomeric mixture being limited to those in the area of mixtures that produce clear terpolymers, said area encompassing the line joining the polymerization azeotrope composition of styrene and acrylonitrile on the one hand and styrene and the particular (c) on the other hand as plotted on an equilateral triangular coordinate graph.

4. A clear terpolymer prepared by free-radical initiated batch mass polymerization to a conversion of at least 20 weight percent of a monomeric mixture consisting of (a) styrene, (b) acrylonitrile, and (c) a monoalkyl fumarate, the proportions of the three monomers in said monomeric mixture being limited to those in the area of mixtures that produce clear terpolymers, said area encompassing the line joining the polymerization azeotrope composition of styrene and acrylonitrile on the one hand and styrene and said monoalkyl fumarate on the other hand as plotted on an equilateral coordinate graph.

5. A clear terpolymer prepared by free-radical initiated batch mass polymerization to a conversion of at least 20 weight percent of a monomeric mixture consisting of (a) styrene, (b) acrylonitrile, and (c) a monoalkyl maleate, the proportions of the three monomers in said monomeric mixture being limited to those in the area of mixtures that produce clear terpolymers, said area encompassing the line joining the polymerization azeotrope composition of styrene and acrylonitrile on the one hand and styrene and said monoalkyl maleate on the other hand as plotted on an equilateral triangular coordinate graph.

6. A clear terpolymer prepared by free-radical initiated batch polymerization to a conversion of at least 20 weight percent of a monomeric mixture consisting of (a) styrene, (b) acrylonitrile, and (c) monoethyl maleate, the proportions of the three monomers in said monomeric mixture being limited to those in the area of mixtures that produce clear terpolymers, said area encompassing the line joining the polymerization azeotrope composition of styrene and acrylonitrile on the one hand and styrene and monoethyl maleate on the other hand as plotted on an equilateral triangular coordinate graph.

7. A polymerization process which comprises forming a 3-component monomeric mixture consisting of (a) a monomer selected from the group consisting of styrene, vinyltoluene and vinylxylene, (b) acrylonitrile, and (c) a monomer selected from the group consisting of monoalkyl fumarate and monoalkyl maleate, the proportions of the three monomers in said monomeric mixture being limited to those in the area of mixtures that produce clear terpolymers, said area encompassing the line joining the polymerization azeotrope composition of the particular (a) and acrylonitrile on the one hand and the particular (a) and the particular (c) on the other hand as plotted on an equilateral triangular coordinate graph, and subjecting a batch of said monomeric mixture to free-radical initiated match polymerization forming an essentially clear, homogeneous, high molecular weight terpolymer in an amount of at least 20 weight percent of said monomeric mixture.

8. A polymerization process which comprises forming a 3-component monomeric mixture consisting of (a) a monomer selected from the group consisting of styrene, vinyltoluene and vinylxylene, (b) acrylonitrile, and (c) a monomer selected from the group consisting of monoalkyl fumarate and monoalkyl maleate, the proportions of the three monomers in said monomeric mixture being limited to those in the area of mixtures that produce clear terpolymers, said area encompassing the line joining the polymerization azeotrope composition of the particular (a) and acrylonitrile on the one hand and the particular (a) and the particular (c) on the other hand as plotted on an equilateral triangular coordinate graph, and subjecting a batch of said monomeric mixture to free-radical initiated batch mass polymerization forming an essentially clear homogeneous high molecular weight terpolymer in an amount of at least 20 weight percent of said monomeric mixture.

9. A process according to claim 7 wherein said monomeric mixture consists of (a) styrene, (b) acrylonitrile and (c) a monoalkyl fumarate.

10. A process according to claim 7 wherein said monomeric mixture consists of (a) styrene, (b) acrylonitrile and (c) a monoalkyl maleate.

11. A process according to claim 7 wherein said monomeric mixture consists of (a) styrene, (b) acrylonitrile and (c) monoethyl maleate.

References Cited in the file of this patent

UNITED STATES PATENTS

| 2,439,227 | Seymour | Apr. 6, 1948 |
| 2,607,762 | Bowen | Aug. 19, 1952 |
| 2,829,128 | Slocombe et al. | Apr. 1, 1958 |